Patented May 4, 1948

2,440,703

UNITED STATES PATENT OFFICE 2,440,703

N,N-DIMETHYL-N'-BENZYL-N'-(2-THIAZOLYL)-ETHYLENE-DIAMINES

Clarence W. Sondern, Mendham, and Philip J. Breivogel, Glen Ridge, N. J., assignors to White Laboratories, Incorporated, Newark, N. J., a corporation of New Jersey No Drawing. Original application January 2, 1947, Serial No. 720,317. Divided and this application January 4, 1947, Serial No. 720,318

3 Claims. (Cl. 260—302)

This invention relates to anti-histamine compounds, particularly to the preparation of a new compound, N,N-dimethyl-N'-benzyl-N'(2-thiazolyl)-ethylenediamine and of salts thereof having anti-histamine properties.

It is known that, fundamentally, clinical manifestations of many allergies are due to tissue liberation of histamine brought about by the offending allergens. In the attempt to relieve such clinical manifestations, it has been proposed to administer compounds to the allergic individual which antagonize or counteract the physio-pathological effects of histamine. Such compounds are referred to as anti-histamine compounds.

Although some progress has been made in this field, there has heretofore been discovered no compound which is highly effective and which is reasonably free from undesirable toxic effects. The advantages of a compound or product which could be administered safely and conveniently to an individual suffering from an allergy due to histamine and which could successfully overcome this condition are apparent.

It is, therefore, an object of the present invention to provide a new and useful therapeutic agent.

An additional object is to provide a therapeutic agent for combatting allergic conditions due to histamine sensitivity.

A further object is to provide a substance possessing a low degree of toxicity and suitable for therapeutic use.

It has now been found that the heretofore undescribed compound, N,N-dimethyl-N'-benzyl-N'-(2-thiazolyl)-ethylenediamine, and its salts with acids are effective agents in combatting allergic conditions due to histamine when administered in dosage forms such as tablets, capsules, elixir, syrup or tincture. The free diamine has the structural formula:

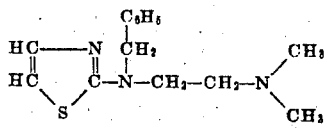

and is formed readily by reacting together a 2-halothiazole and N,N-dimethyl-N'-benzyl-ethylenediamine in the presence of a dehydrohalogenating agent, such as pyridine. Following the condensation the product may be isolated in any convenient manner e. g., by concentrating the reaction mixture to a small volume, extracting with ether and distilling the extract.

N,N-dimethyl-N' - benzyl - N'-(2-thiazolyl) - ethylenediamine is a light colored oily substance boiling at 130° to 155° C. at 15 millimeters. It forms a picrate melting at 138° to 141° C. It forms well defined crystalline salts with acids such as hydrochloric, hydrobromic, sulfuric, acetic, benzoic and propionic acids. The monohydrochloride melts at 176°–177° C.

N,N-dimethyl-N'-benzyl - ethylenediamine is formed readily by reacting together benzyl amine and beta-dimethylaminoethyl chloride. Isolation of the product is effected readily by extraction from the alkalized reaction mixture with ether and distillation of the extract. N,N-dimethyl-N'-benzyl-ethylenediamine is a substantially colorless oil boiling at 121° to 123° C. at 9 millimeters pressure and having an index of refraction $N_D^{25}$ of 1.507. The picrate melts at 162° to 164° C.

This application is a division of a concurrently filed co-pending application, Serial No. 720,317.

Certain advantages of the invention are apparent from the following examples which are given by way of illustration only and are not to be construed as limiting.

*Example 1.—N,N-dimethyl - N'-benzyl-ethylenediamine*

A solution of 108 grams of beta-dimethylaminoethyl chloride in 125 milliliters of ether was added over a period of one-half hour and with rapid stirring to a solution of 108 grams of benzyl amine and 98 grams of potassium acetate in 500 milliliters of alcohol maintained at about 30° C. Stirring was continued at 30° C. for an additional two hours and then for six and one-half hours at 45° to 50° C. After standing overnight at room temperature, the mixture was acidified to Congo red with concentrated aqueous hydrochloric acid, about 150 milliliters being required. The mixture was cooled to room temperature and the precipitated potassium chloride was removed by filtering and washing the residue with 75 milliliters of alcohol. The combined filtrate and washings were concentrated to 300 milliliters, 150 grams of potassium hydroxide was added and the mixture extracted with 600 milliliters of ether. The ethereal extract was dried over solid potassium hydroxide, the ether evaporated and the oily residue distilled in vacuo. The fraction distilling at 121° to 123° C. at 9 millimeters pressure weighed 33 grams and was practically pure N,N-dimethyl-N'-benzyl - ethylenediamine. The product was a colorless, oily liquid having an index of refraction $N_D^{25}$ of 1.507. It formed a picrate melting at 162° to 164° C.

*Example 2.—N,N-dimethyl-N'-benzyl-N'-(2-thiazolyl)-ethylenediamine*

A mixture of 25 grams of 2-bromothiazole, 50 grams of N,N-dimethyl-N'-benzyl-ethylenediamine and 35 grams of pyridine was refluxed for 3½ hours. The temperature of the liquid during refluxing was about 142° C. The pyridine was then removed by distillation in vacuo until the vapor temperature rose to 120° at 30 millimeters. The residue from the distillation was cooled to room temperature, rendered alkaline by adding 50 milliliters of 20 per cent aqueous sodium hydroxide solution and the mixture then extracted with 300 milliliters of ether. The ethereal extract was dried over anhydrous sodium carbonate and the ether removed by distillation. The dark, oily residue was then distilled in vacuo and the fraction which boiled at 130° to 155° C. at 15 millimeters was collected separately. This fraction weighed 14.6 grams and consisted principally of N,N-dimethyl-N'-benzyl-N'-(2-thiazolyl)-ethylenediamine. The base was purified by conversion to the picrate which, after recrystallization from methanol, melted at 138° to 141° C. The free base was isolated from the picrate by treating the latter with aqueous sodium hydroxide, extracting the mixture with ether and distilling the ether.

The hydrochloride was prepared as follows:

After isolation from the picrate, 10.1 grams of the free base was dissolved in 10 milliliters of anhydrous alcohol and 13.9 milliliters of alcoholic hydrochloric acid (100 milliliters=10 grams HCl) added. The clear solution was concentrated to 20 milliliters and the monohydrochloride precipitated by the addition of acetone. The total yield of monohydrochloride was 10.4 grams. This was recrystallized first from a mixture of two parts of ethyl acetate, and one part of anhydrous alcohol, and then from n-butanol. The yield of pure monohydrochloride was 8.4 grams. This corresponded to a yield of 17.5 per cent, based on the 2-bromothiazole used.

Anal.: Calc'd for $C_{14}H_{20}N_3SCl$—C, 56.41; H, 6.77; N, 14.10; S, 10.76; Cl, 11.90. Found: C, 56.48; H, 6.86; N, 14.29; S, 10.54; Cl, 12.11.

We claim:

1. A compound selected from the class consisting of N,N-dimethyl-N'-benzyl-N'-(2-thiazolyl)-ethylenediamine and salts thereof.
2. N,N-dimethyl-N'-benzyl-N'-(2-thiazolyl)-ethylenediamine.
3. N,N-dimethyl-N'-benzyl-N'-(2-thiazolyl)-ethylenediamine monohydrochloride.

CLARENCE W. SONDERN.
PHILIP J. BREIVOGEL.